UNITED STATES PATENT OFFICE.

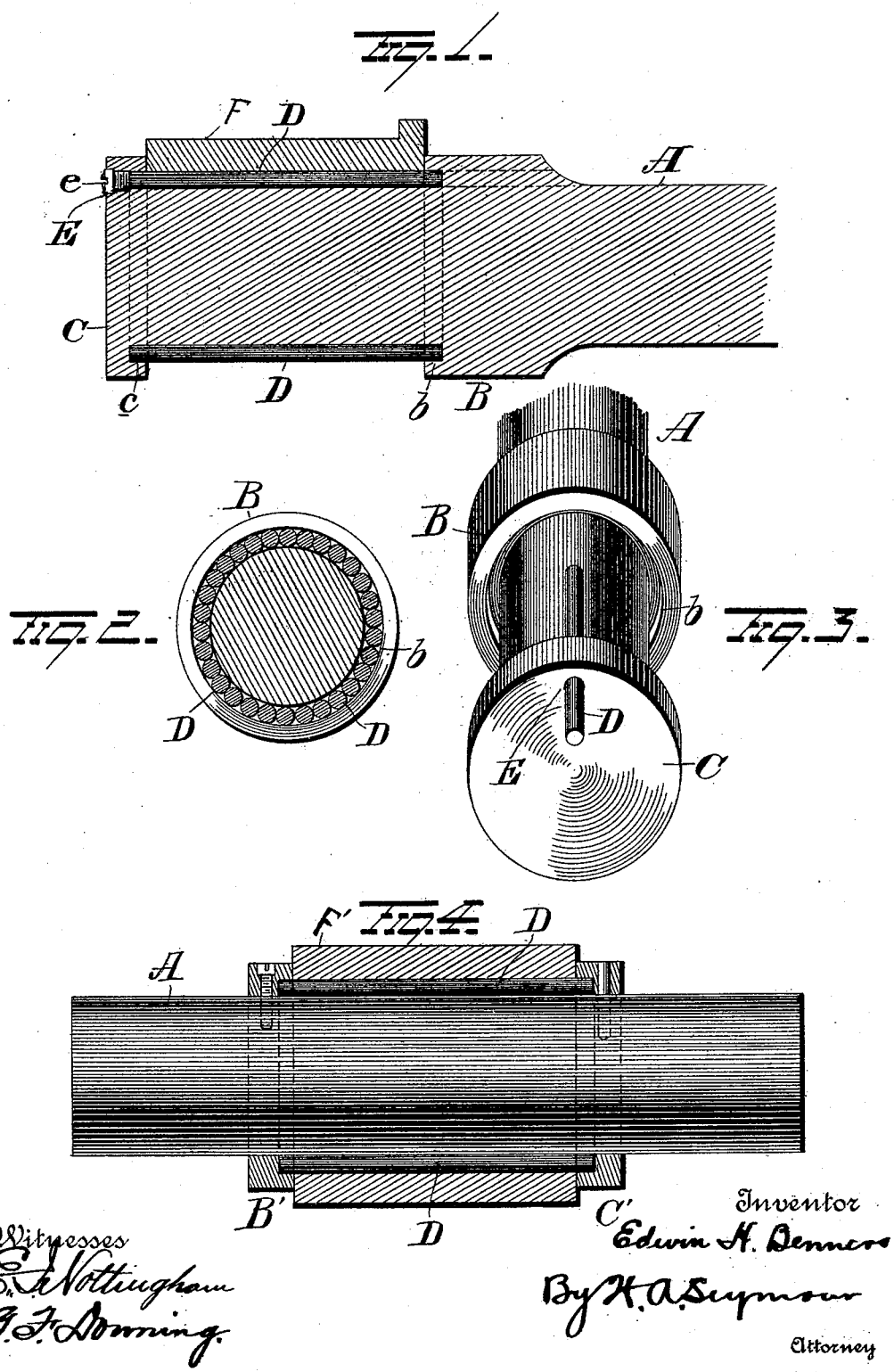

EDWIN HENDRY BENNERS, OF ELIZABETH, NEW JERSEY.

ROLLER-BEARING.

SPECIFICATION forming part of Letters Patent No. 498,228, dated May 30, 1893.

Application filed December 7, 1892. Serial No. 454,355. (No model.)

*To all whom it may concern:*

Be it known that I, EDWIN HENDRY BENNERS, of Elizabeth, in the county of Union and State of New Jersey, have invented certain new and useful Improvements in Roller-Bearings; and I do hereby declare the following to be a full, clear, and exact description of the invention, such as will enable others skilled in the art to which it appertains to make and use the same.

My invention relates to an improvement in roller bearings, the object being to provide improved means for reducing friction in journals and the invention consists in certain novel features of construction and combinations of parts which will be hereinafter described and pointed out in the claim.

In the accompanying drawings, Figure 1 is a longitudinal sectional view. Fig. 2 is an end elevation. Fig. 3 is a transverse section and Fig. 4 is a longitudinal section of a modification.

A represents the axle or shaft constructed to receive the rollers which form my improved roller bearing. This axle or shaft is provided with integral collars B and C, said collars located a sufficient distance apart to receive the ends of the rollers. In order to receive these rollers the collars are provided on their inner faces with annular recesses $b$ and $c$ respectively of sufficient depth to receive the ends of the rollers.

D D represent the rollers. These are all of the same diameter and length, they just reaching from the inner wall of one recess to the inner wall of the other and substantially filling the recesses and yet not fitting tight therein. In this manner the rollers bear upon the portion of the axle extending between the inner walls of the recesses and there are a sufficient number of these rollers to entirely surround this portion of the axle. Over the rollers a bearing F is located as shown in Fig. 1, and on this bearing the weight is supported. As the collars B and C in this form of construction are integral with the axle some convenient means must be provided for inserting the rollers. This consists in a hole E formed in either collar, preferably the outer one C as shown in full lines, and this hole E may be closed by a screw $e$ or similar means. When it is desired to insert or remove a roller, it is slid endwise through this hole and when the space is filled with rollers the screw is turned into the hole to close it. The rollers are preferably of equal diameter and in this manner each one bears equally upon the journal box. When constructed in this manner, the journal box has to be made in sections.

In the modification the journal box may be in one piece but the collars B' and C' in this construction are made removable and are held in place by pins or similar devices as the case may be. Surrounding the rollers is a bearing or sleeve F' upon which the load is supported.

The advantage of both constructions over roller bearings connected with the axle or journal box is that the rollers in the present invention are connected with the moving part, that is to say the axle and consequently the tendency is to carry them along with the axle as the latter rotates in addition to their tendency to rotate themselves by virtue of their contact with the journal box, whereas when they are supported in the journal box, owing to the fact that the lattter is stationary, the rollers are moved only by frictional contact. The difference in the friction is decidedly in my favor it will be seen.

Slight changes might be made in addition to those described without departing from the spirit and scope of my invention and hence I do not wish to limit myself to the exact construction herein set forth, but, Having fully described my invention, what I claim as new, and desire to secure by Letters Patent, is—

The combination with a revoluble shaft or axle having collars thereon, said collars each having an annular space in its inner face, and one having a hole leading through it into the groove, of cylindrical rollers adapted to be inserted endwise through the hole, the ends of said rollers adapted to enter the grooves, and means for closing the hole in the collar whereby the rollers are locked therein, substantially as set forth.

In testimony whereof I have signed this specification in the presence of two subscribing witnesses.

EDWIN HENDRY BENNERS.

Witnesses:
A. D. KEYS,
H. C. THURSTON.